(12) United States Patent
Mototsune et al.

(10) Patent No.: US 9,303,747 B2
(45) Date of Patent: Apr. 5, 2016

(54) LOCK-UP DEVICE FOR TORQUE CONVERTER

(71) Applicant: EXEDY Corporation, Neyagawa-shi, Osaka (JP)

(72) Inventors: Ken Mototsune, Neyagawa (JP); Kazuhito Maeda, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/380,291

(22) PCT Filed: Apr. 8, 2013

(86) PCT No.: PCT/JP2013/060595
§ 371 (c)(1),
(2) Date: Aug. 21, 2014

(87) PCT Pub. No.: WO2013/154065
PCT Pub. Date: Oct. 17, 2013

(65) Prior Publication Data
US 2015/0008086 A1    Jan. 8, 2015

(30) Foreign Application Priority Data

Apr. 10, 2012  (JP) ................................. 2012-088953

(51) Int. Cl.
*F16H 45/02*    (2006.01)
*F16D 33/18*    (2006.01)

(52) U.S. Cl.
CPC ............... *F16H 45/02* (2013.01); *F16D 33/18* (2013.01); *F16H 2045/021* (2013.01); *F16H 2045/0221* (2013.01); *F16H 2045/0231* (2013.01); *F16H 2045/0294* (2013.01)

(58) Field of Classification Search
None
See application file for complete search history.

(56) References Cited

U.S. PATENT DOCUMENTS

| | | | | |
|---|---|---|---|---|
| 8,967,349 B2* | 3/2015 | Ushio | ..................... | F16H 45/02 192/3.29 |
| 2006/0124420 A1* | 6/2006 | Ackermann | ............ | F16H 45/02 192/3.29 |
| 2009/0032351 A1* | 2/2009 | Uhler | .................. | F16D 25/0635 192/3.29 |
| 2012/0261225 A1* | 10/2012 | Sudau | ................... | F16D 25/123 192/3.21 |
| 2012/0298471 A1* | 11/2012 | Heck | ..................... | F16D 1/0858 192/112 |
| 2013/0224002 A1* | 8/2013 | Ito | ........................... | F16H 41/30 415/182.1 |
| 2014/0262666 A1* | 9/2014 | Ushio | ..................... | F16H 45/02 192/3.29 |
| 2014/0326563 A1* | 11/2014 | Ushio | ..................... | F16H 45/02 192/3.28 |

FOREIGN PATENT DOCUMENTS

| | | |
|---|---|---|
| JP | 2002-081521 A | 3/2002 |
| JP | 2010-48291 A | 3/2010 |
| JP | 2011-190845 A | 9/2011 |
| JP | 2012-215221 A | 11/2012 |

* cited by examiner

*Primary Examiner* — Richard Lorence
(74) *Attorney, Agent, or Firm* — Global IP Counselors, LLP (57) ABSTRACT

A lock-up device includes a clutch portion and a damper mechanism. The clutch portion includes a clutch output member, a clutch plate, an oil chamber plate having a disc shape and a piston. The oil chamber plate is disposed between a front cover and an inner peripheral part of a turbine, while being axially immovable with respect to the front cover. The piston is disposed between the front cover and the oil chamber plate while being axially movable. The piston forms a first oil chamber for lock-up actuation together with the oil chamber plate, and forms a second oil chamber for lock-up releasing together with the front cover.

9 Claims, 4 Drawing Sheets

LOCK-UP DEVICE FOR TORQUE CONVERTER

CROSS-REFERENCE TO RELATED APPLICATIONS

This application is a U.S. National stage application of International Application No. PCT/JP2013/060595, filed Apr. 8, 2013, which claims priority to Japanese Patent Application No. 2012-088953, filed in Japan on Apr. 10, 2012, the entire contents of which are hereby incorporated by reference.

BACKGROUND

1. Field of Invention

The present invention relates to a lock-up device, particularly to a lock-up device for a torque converter, which is configured to transmit torque from a front cover to a transmission-side member through a turbine of the torque converter.

2. Background Information

In many cases, a torque converter is provided with a lock-up device for directly transmitting torque from a front cover to a turbine. The lock-up device includes: a piston that can be frictionally coupled to the front cover; a drive plate fixed to the piston; a plurality of torsion springs supported by the drive plate; and a driven plate elastically coupled to the piston and the drive plate by the plural torsion springs in a rotational direction. The driven plate is fixed to the turbine.

Further, as described in Japanese Laid-open Patent Application Publication No. JP-A-2010-48291, a lock-up device of so-called a multi-plate type using a plurality of clutch plates has been also proposed for increasing the clutch capacity of the lock-up device.

The lock-up device described in Japanese Laid-open Patent Application Publication No. JP-A-2010-48291 includes: a clutch portion disposed between a front cover and a turbine; a power transmission plate coupled to an output member of the clutch portion; and a plurality of torsion springs configured to elastically couple the power transmission plate and the turbine. The clutch portion includes a plurality of clutch plates and a piston disposed between the front cover and the plural clutch plates.

When hydraulic pressure is supplied to the back of the piston, the piston is moved toward the plural clutch plates. The clutch plates are thereby pressed against each other. Accordingly, a lock-up state (power transmitted state) is produced. Under the condition, torque from the front cover is transmitted to the power transmission plate through the clutch portion, and is further transmitted to the turbine through the plural torsion springs.

SUMMARY

In the device described in Japanese Laid-open Patent Application Publication No. JP-A-2010-48291, a member composing the clutch portion and a member for supporting the power transmission plate are disposed between the front cover and the turbine inner peripheral part. Therefore, the clutch portion is inevitably disposed radially outward of these components.

Further, in the clutch portion, a lock-up oil chamber is formed between the front cover and the piston, whereas the plural clutch plates and a backing plate for supporting these clutch plates are disposed between the piston and the turbine.

It is difficult for the well-known lock-up device as described above to reduce the axial space thereof.

It is an object of the present invention to compactly form a lock-up device in its axial direction by devising arrangement of a piston and an oil chamber.

A lock-up device for a torque converter according to a first aspect of the present invention is a device configured to transmit a torque from a front cover to a transmission-side member through a turbine of the torque converter, and includes a clutch portion and a damper mechanism. The clutch portion is disposed between the front cover and the turbine, and is configured to transmit or block the torque. The damper mechanism is configured to transmit the torque from the clutch portion to the turbine, while being configured to absorb and attenuate a torsional vibration. Further, the clutch portion includes: a clutch output member configured to output the torque to the damper mechanism; a clutch plate configured to transmit the torque between the front cover and the clutch output member; an oil chamber plate having a disc shape; and a piston. The oil chamber plate is disposed between the front cover and an inner peripheral part of the turbine, while being axially immovable with respect to the front cover. The piston is disposed between the front cover and the oil chamber plate while being axially movable, forms a first oil chamber for lock-up actuation together with the oil chamber plate therebetween, forms a second oil chamber for lock-up releasing together with the front cover therebetween, and is configured to set the clutch portion in an engaged state by an operating oil to be supplied to the first oil chamber.

In lock-up actuation, the present device is configured to supply the operating oil to the first oil chamber for lock-up actuation. Accordingly, the piston is moved toward the front cover, and presses the clutch plate. In this condition, the torque from the front cover is outputted from the clutch portion to the turbine through the damper mechanism.

The first oil chamber for lock-up actuation is herein formed between the front cover and the turbine, and the lock-up state is produced when the piston is moved from the turbine side to the front cover side. Therefore, the present lock-up device can be reduced in its axial dimension in comparison with a well-known lock-up device.

Further, the first oil chamber for lock-up actuation and the second oil chamber for lock-up releasing are formed. Hence, responsiveness is enhanced in switching between lock-up actuation and lock-up releasing. Yet further, the second oil chamber is composed of the piston and the front cover. Therefore, the oil chamber for lock-up releasing can be composed of a small number of components, and the present lock-up device can be further reduced in its axial dimension.

A lock-up device for a torque converter according to a second aspect of the present invention relates to the device of the first aspect, and wherein the clutch portion further includes an axially extending annular boss. Further, the annular boss is a member that an inner peripheral part of the oil chamber plate is fixed to an end thereof disposed on the same side as the transmission. The annular boss is also fixed to the front cover at an end surface thereof disposed on the same side as the front cover. The annular boss causes the piston to axially slide along an outer peripheral surface thereof, and has an oil path formed for supplying the operating oil to the first oil chamber.

A lock-up device for a torque converter according to a third aspect of the present invention relates to the device of the first or second aspect, and wherein the turbine includes a plurality of turbine blades, a turbine shell supporting the plural turbine blades, and a turbine hub to which the turbine shell is coupled. The turbine hub has a flange part that radially extends and to which an inner peripheral part of the turbine shell is coupled. The flange portion includes an axial support part formed in an outer peripheral part thereof, and a radial support part that has a tubular shape and extends from an outer peripheral end of the axial support part toward the front cover. Further, the clutch output member includes a clutch engaging part, a damper engaging part, a radial contact part and an axial contact part. The clutch engaging part is formed in a radially intermediate part of the clutch output member to extend toward the front cover. The clutch engaging part is engaged with the clutch plate, while being axially movable and non-rotatable relatively thereto. The damper engaging part is formed in an outer peripheral part of the clutch output member, and is engaged with the damper mechanism. The radial contact part is formed in an inner peripheral part of the clutch output member to axially extend in a tubular shape, and is contacted to the radial support part of the turbine hub. The axial contact part protrudes from the radial contact part to an inner peripheral side, and is contacted to the axial support part of the turbine hub.

Here, the clutch engaging part and the damper engaging part are formed in the clutch output member. Hence, a power transmission path can be composed of a small number of components. Further, the clutch output member can be easily positioned in the axial and radial directions by causing a part of the clutch output member to be contacted to the axial support part and the radial support part of the turbine hub.

A lock-up device for a torque converter according to a fourth aspect of the present invention relates to the device of the third aspect, and wherein the damper mechanism includes a plurality of torsion springs and an intermediate member. The plural torsion springs are engaged with the clutch output member. The intermediate member is disposed to be rotatable relative to the clutch output member, and causes at least two of the plural torsion springs to act in series. Further, the intermediate member includes a plurality of spring engaging parts engaged with end surfaces of the torsion springs, a plurality of cover parts covering outer peripheral side parts of the torsion springs and lateral parts, disposed on the same side as the front cover, of the torsion springs, and a plurality of protruding parts extending from the cover part to the inner peripheral side. Yet further, the clutch output member has a positioning part that is disposed to the outer peripheral side of the clutch engaging part and to the inner peripheral side of the damper engaging part and is contacted to the plural protruding parts of the intermediate member to position the intermediate member.

Here, the intermediate member can be positioned by the clutch output member.

A lock-up device for a torque converter according to a fifth aspect of the present invention relates to the device of the fourth aspect, and wherein the positioning part of the clutch output member includes: a radial positioning part contacted to an inner peripheral end surface of the intermediate member to radially position the intermediate member; and an axial positioning part contacted to lateral surfaces of the plural protruding parts of the intermediate member to axially position the intermediate member.

A lock-up device for a torque converter according to a sixth aspect of the present invention relates to the device of the second aspect, and wherein the annular boss has an oil path formed for supplying the operating oil to the second oil chamber for lock-up releasing.

As described above, the present invention reduces the axial dimension of the clutch portion.

DESCRIPTION OF EXEMPLARY EMBODIMENTS

Entire Structure of Torque Converter

Figure 1:
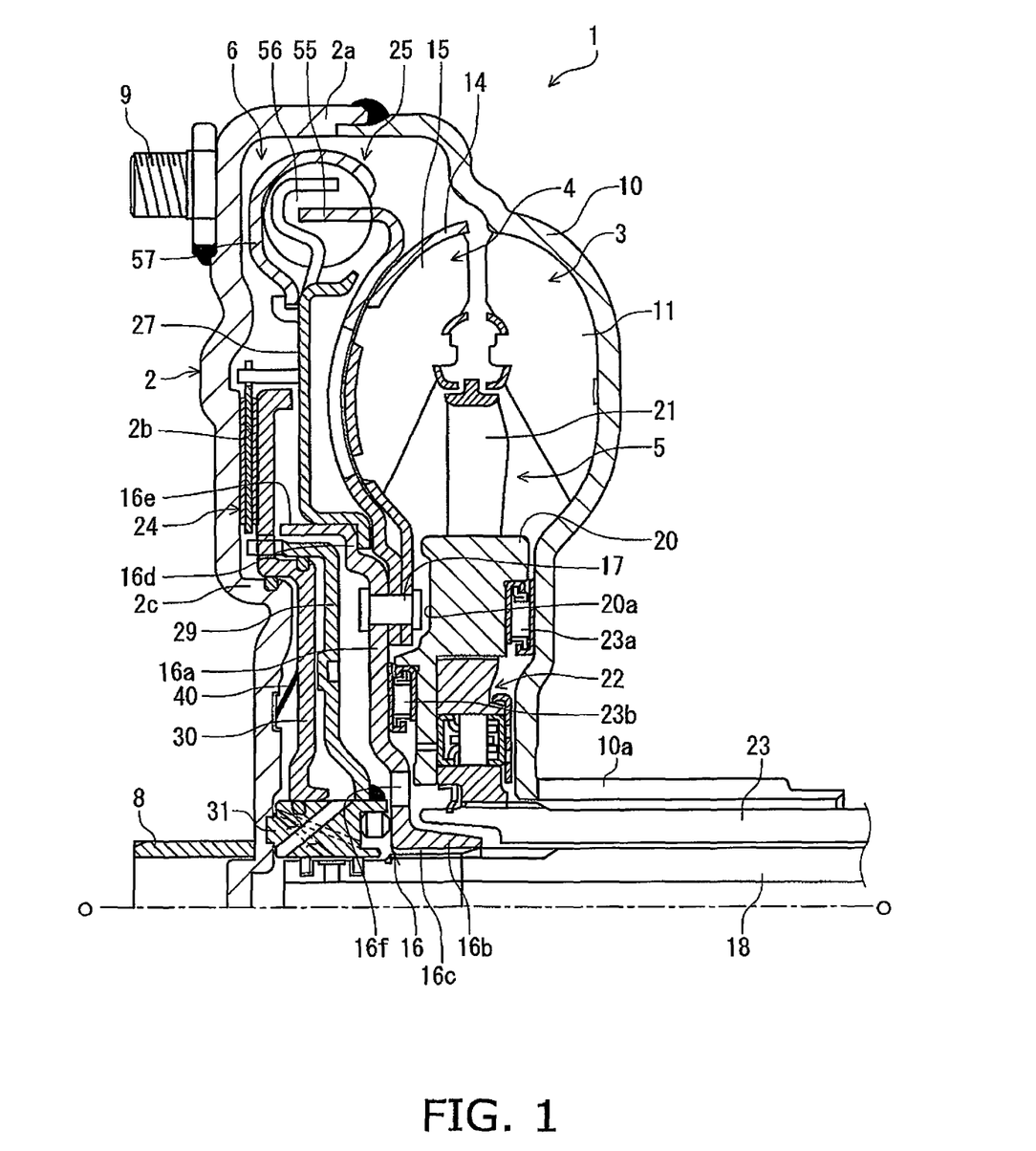
FIG. 1 is a partial cross-sectional view of a torque converter equipped with a lock-up device according to an exemplary embodiment of the present invention.

FIG. 1 is a vertical cross-sectional view of a torque converter 1 employing an exemplary embodiment of the present invention. The torque converter 1 is a device for transmitting torque from a crankshaft of an engine to an input shaft of a transmission. In FIG. 1, the engine (not illustrated in the drawing) is disposed on the left side, whereas the transmission (not illustrated in the drawing) is disposed on the right side. A line O-O depicted in FIG. 1 indicates a rotary axis of the torque converter 1.

The torque converter 1 mainly includes a front cover 2; a torque converter body composed of three types of vane wheels (an impeller 3, a turbine 4 and a stator 5), and a lock-up device 6.

Front Cover 2

The front cover 2 is a disc-shaped member, and a center boss 8 is fixed to the inner peripheral end thereof by welding. The center boss 8 is a cylindrical member extending in the axial direction, and is inserted into a center hole bored in the crankshaft (not illustrated in the drawings).

It should be noted that the front cover 2 is designed to be coupled to the crankshaft of the engine through a flexible plate, although not illustrated in the drawings. In other words, a plurality of bolts 9 are fixed to the engine-side surface of the outer peripheral part of the front cover 2, while being aligned at equal intervals in the circumferential direction. The outer peripheral part of the flexible plate is fixed to the front cover 2 by nuts screwed onto the bolts 9.

An outer peripheral tubular part 2a is formed in the outer peripheral part of the front cover 2, while axially extending toward the transmission. The impeller 3 is fixed to the tip end of the outer peripheral tubular part 2a by welding. As a result, the front cover 2 and the impeller 3 form a fluid chamber that operating oil is filled in the inside thereof.

Further, a friction surface 2b is formed on the turbine-4-side lateral surface of the radially intermediate part of the front cover 2. Yet further, a tubular seal part 2c is formed on the inner peripheral side of the friction surface 2b, while axially extending toward the turbine 4.

Impeller 3

The impeller 3 is mainly composed of an impeller shell 10 and a plurality of impeller blades 11 fixed to the inside of the impeller shell 10. Further, as described above, the outer peripheral tip end of the impeller shell 10 is welded to the front cover 2. It should be noted that a tubular part 10a is formed on the inner peripheral end of the impeller shell 10, while extending toward the transmission.

Turbine 4

The turbine 4 is disposed axially in opposition to the impeller 3. The turbine 4 is mainly composed of: a turbine shell 14, a plurality of turbine blades 15 fixed to the inside of the turbine shell 14, and a turbine hub 16 fixed to the inner peripheral end of the turbine shell 14. The turbine shell 14 and the turbine hub 16 are fixed by a plurality of rivets 17.

The turbine hub 16 has a flange part 16a having a disc shape and a tubular part 16b. The flange part 16a is a part that the inner peripheral end of the turbine shell 14 is fixed thereto by the rivets 17. The tubular part 16b is formed to extend toward the transmission from the inner peripheral end of the flange part 16a. Further, a spline hole 16c is bored in the inner peripheral part of the tubular part 16b. The spline hole 16c is meshed with a spline shaft formed on the tip end of the input shaft 18 of the transmission.

The flange part 16a has an axial support part 16d and a radial support part 16e in the outer peripheral part thereof. The axial support part 16d is formed on the outer peripheral end of the flange part 16a, while being parallelly shifted from the flange part 16a in the axial direction. The radial support part 16e has a tubular shape and extends axially toward the front cover 2 from the tip end of the axial support part 16d.

It should be noted that a through hole 16f for supplying operating oil is bored in the inner peripheral part of the flange part 16a of the turbine hub 16 to supply the operating oil of the torque converter to the impeller 3.

Stator 5

The stator 5 is a mechanism disposed between the inner peripheral part of the impeller 3 and that of the turbine 4, and serves to regulate the flow of the operating oil returning to the impeller 3 from the turbine 4. The stator 5 is integrally formed by means of casting of resin, aluminum alloy or so forth. The stator 5 mainly includes: a stator shell 20 having an annular shape, and a plurality of stator blades 21 mounted to the outer peripheral surface of the stator shell 20. The stator shell 20 is coupled to a stationary shaft 23 through a one-way clutch 22.

It should be noted that an annular recessed part 20a is formed on the front-cover-2 side surface of the stator shell 20, while being located in opposition to the rivets 17. The recessed part 20a is a part formed for avoiding interference with the head parts of the rivets 17. Accordingly, the stator shell 20 and the flange part 16a of the turbine hub 16 can be axially disposed closer to each other, and reduction in axial dimension is enabled.

Further, a thrust bearing 23a is disposed between the stator shell 20 and the impeller shell 10, while a thrust bearing 23b is disposed between the stator shell 20 and the flange part 16a of the turbine hub 16.

Lock-up Device

The lock-up device 6 is a device disposed between the front cover 2 and the turbine 4, and serves to directly transmit power from the front cover 2 to the turbine 4. The lock-up device 6 includes a clutch portion 24 disposed between the front cover 2 and the turbine 4, and a damper mechanism 25 configured to transmit torque from the clutch portion 24 to the turbine 4.

Clutch Portion 24

The clutch portion 24 is configured to transmit torque from the front cover 2 to the damper mechanism 25 or block transmission of torque between the front cover 2 and the damper mechanism 25. As illustrated in an enlarged view of FIG. 2, the clutch portion 24 includes a clutch output member 27, a clutch plate 28, an oil chamber plate 29, a piston 30 and a boss 31.

Figure 2:
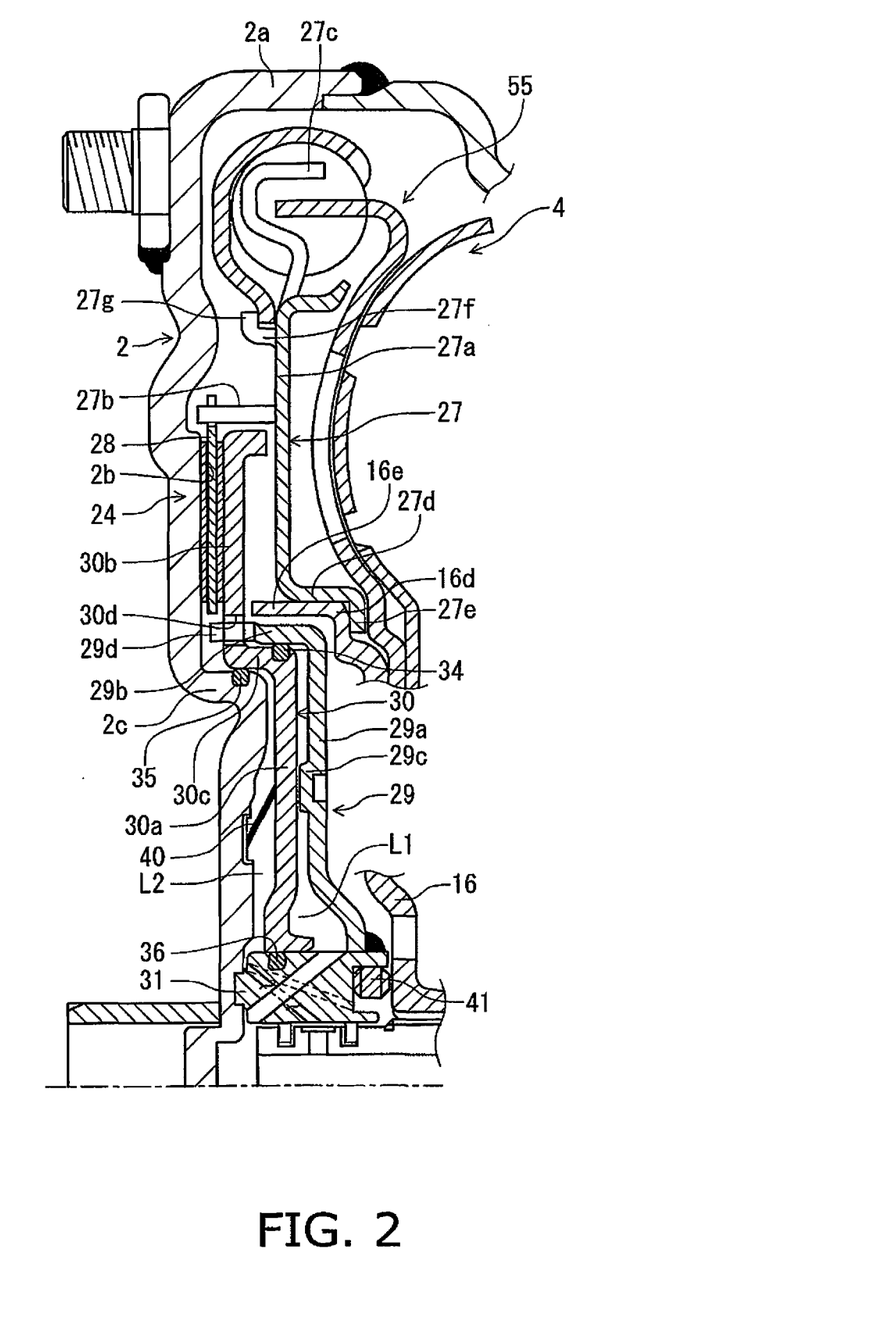
FIG. 2 is a diagram illustrating the lock-up device for the torque converter illustrated in FIG. 1.

The clutch output member 27 is disposed between the front cover 2 and the turbine 4. The clutch output member 27 is annularly formed and has a disc part 27a having a disc shape, clutch engaging parts 27b, a plurality of damper engaging parts 27c, a radial contact part 27d, an axial contact part 27e, a plurality of radial positioning parts 27f and a plurality of axial positioning parts 27g. The respective parts are formed by stamping of a single plate.

The plural clutch engaging parts 27b are formed by partially bending the radially intermediate part of the disc part 27a toward the front cover 2.

The plural damper engaging parts 27c are formed to extend from the outer peripheral part of the disc part 27a to the further outer peripheral side. Each damper engaging part 27c has a part extending to the outer peripheral side and a part extending in the axial direction. Each damper engaging part 27c is capable of being engaged with the end, surface of one of the torsion springs (to be described) composing a part of the damper mechanism 25.

The radial contact part 27d is a part formed by bending the inner peripheral end of the disc part 27a toward the turbine 4. The radial contact part 27d has a tubular shape and extends in the axial direction. The radial contact part 27d is contacted to and supported by the radial support part 16e of the turbine hub 16. With such structure, the clutch output member 27 is positioned in the radial direction.

Further, the axial contact part 27e is a part formed by bending the axial end of the radial contact part 27d to the inner peripheral side, and has an annular shape. The axial contact part 27e is axially interposed and held between the axial support part 16d of the turbine hub 16 and an output plate 55 (to be described). With such structure, the clutch output member 27 is positioned in the axial direction.

The plural radial positioning parts 27f are parts formed by partially bending the outer peripheral part of the disc part 27a toward the front cover 2, and extend in the axial direction. The axial positioning parts 27g are parts formed by bending the axial ends of the radial positioning parts 27f to the outer peripheral side.

The clutch plate 28 has a disc shape and is disposed in opposition to the friction surface 2b of the front cover 2. Annular friction members are respectively fixed to the both faces of the clutch plate 28. Further, a plurality of teeth are formed on the outer peripheral end of the clutch plate 28 to be engaged with the clutch engaging parts 27b of the clutch output member 27. With such structure, the clutch plate 28 is axially movable with respect to and non-rotatable relatively to the clutch output member 27.

The oil chamber plate 29 is disposed between the front cover 2 and the turbine hub 16. The oil chamber plate 29 has a disc part 29a and a tubular part 29b extending axially toward the front cover 2 from the outer peripheral end of the disc part 29a. The disc part 29a is fixed to the outer peripheral surface of the boss 31. Further, a plurality of embossed parts 29c are formed on the radially intermediate part of the disc part 29a, while protruding toward the front cover 2. The embossed parts 29c are capable of making contact with the lateral surface of the piston 30. A plurality of teeth 29d are formed on the tip end of the tubular part 29b.

The piston 30 is disposed between the front cover 2 and the oil chamber plate 29. The piston 30 has an oil chamber composing part 30a having a disc shape, a pressing part 30b, and a coupling part 30c coupling these parts.

The oil chamber composing part 30a is disposed in opposition to the inner peripheral part of the front cover 2 and the disc part 29a of the oil chamber plate 29. Further, the inner peripheral end surface of the oil chamber composing part 30a is slidably supported by the outer periphery of the boss 31.

A seal member 34 is mounted to the outer peripheral surface of the coupling part 30c, while being slidably contacted to the inner peripheral surface of the tubular part 29b of the oil chamber plate 29. A seal member 35 is mounted to the outer peripheral surface of the seal part 2c of the front cover 2, while being contacted to the inner peripheral surface of the coupling part 30c of the piston 30.

The pressing part 30b is opposed to the clutch plate 28. A plurality of cutouts 30d are bored in the inner peripheral side part of the pressing part 30b, while extending in the circumferential direction. The plural teeth 29d of the oil chamber plate 29 are inserted into and engaged with the cutouts 30d. Accordingly, the front cover 2, the oil chamber plate 29 and the piston 30 are rotated in synchronization with each other.

The boss 31 has an annular shape. The front-cover-2 side end surface of the boss 31 is fixed to the lateral surface of the front cover 2. Further, as described above, the inner peripheral end of the oil chamber plate 29 is fixed to the outer peripheral surface of the turbine-4 side end part of the boss 31 by welding. Yet further, the inner peripheral end surface of the piston 30 is slidably supported by the outer peripheral surface of the boss 31. It should be noted that a seal member 36 is mounted to the outer peripheral surface of the boss 31, while being contacted to the inner peripheral end surface of the piston 30.

It should be noted that a disc spring 40 is disposed in a second oil chamber L2 as a return spring for separating the piston 30 from the clutch plate 28. Further, a stopper 41 made of resin is mounted to the turbine-4 side end surface of the boss 31. The turbine hub 16 is contactable to the stopper 41.

Structure for Moving Piston

As described above, the oil chamber composing part 30a, the oil chamber plate 29 and the front cover 2 form a first oil chamber L1 for lock-up actuation on the turbine-4 side of the piston 30, while forming the second oil chamber L2 for lock-up releasing on the front-cover-2 side of the piston 30.

Figure 3:
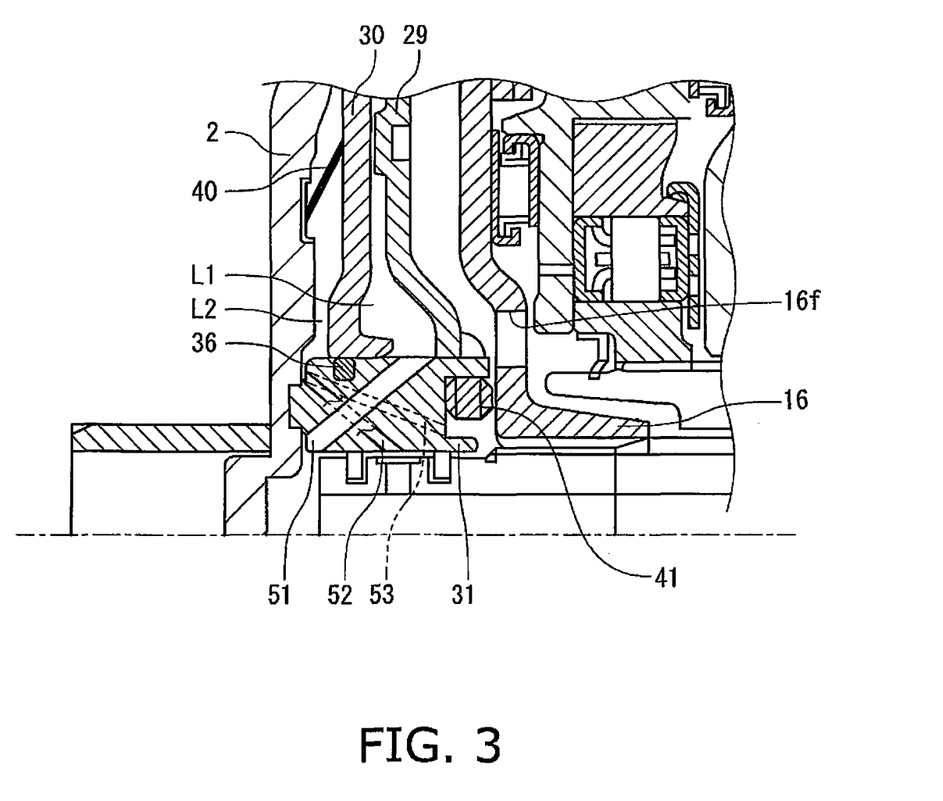
FIG. 3 is an enlarged view of a piston and a structure for supporting the piston of the lock-up device illustrated in FIG. 2.

As illustrated in an enlarged view of FIG. 3, a plurality of first oil paths 51, a plurality of second oil paths 52 and a single third oil path 53 are formed in the boss 31. The first oil paths 51 are formed to radially penetrate through the boss 31, and thereby, the inner peripheral side of the boss 31 and the first oil chamber L1 are communicated. The second oil paths 52 are formed to radially penetrate through the boss 31, and thereby, the inner peripheral side of the boss 31 and the second oil chamber L2 are communicated. Further, the third oil path 53 is formed to penetrate through the front-cover-2 side end surface and the turbine-4 side end surface of the boss 31, and thereby, the second oil chamber L2 and an oil path for supplying the operating oil of the torque converter are communicated.

Damper Mechanism

Figure 4:
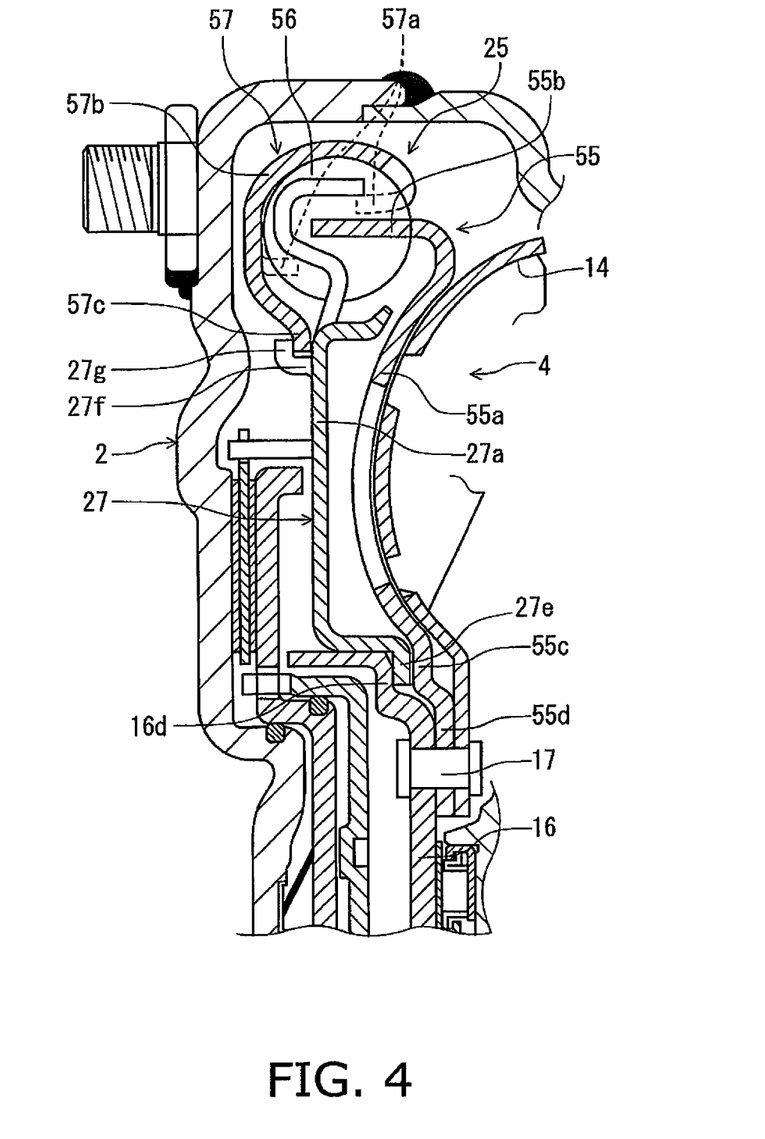
FIG. 4 is an enlarged view of a damper mechanism of the lock-up device illustrated in FIG. 2.

As illustrated in FIG. 4, the damper mechanism 25 includes the output plate 55 fixed to the turbine shell 14, a plurality of torsion springs 56, and an intermediate member 57. It should be noted that FIG. 4 illustrates only the damper mechanism 25 and the related components thereof, which are extracted from the lock-up device 6.

The output plate 55 has a body 55a, a plurality of engaging parts 55b, an axial contact part 55c and an fixation part 55d.

The body 55a has a shape formed along the outer periphery of the turbine shell 14. The plural engaging parts 55b are formed by bending the outer peripheral tip end of the body 55a toward the front cover 2. The plural engaging parts 55b are engaged with both circumferential ends of each unit of torsion springs 46 (two torsion springs 46 in the present exemplary embodiment) configured to act in series.

As described above, the axial contact part 55c is formed in the inner peripheral part of the body 55a, and together with the axial support part 16d of the turbine hub 16, holds and interposes the axial contact part 27e of the clutch output member 27 therebetween.

The fixation part 55d is formed on the further inner peripheral side of the axial contact part 55c, while being parallelly shifted from the axial contact part 55c in the axial direction. The fixation part 55d is fixed to the turbine hub 16 and the turbine shell 14 by the rivets 17.

With the structure as described above, torque inputted from the clutch output member 27 is transmitted to the output plate 55 through the torsion springs 56, and is further transmitted to the turbine 4.

The intermediate member 57 is a member for causing each unit of some (two) of the plural torsion springs 56 to act in series. The intermediate member 57 forms an annular member with a roughly C-shaped cross-section, and has a plurality of engaging parts 57a, a plurality of cover parts 57b and a plurality of protruding parts 57c.

Each engaging part 57a is disposed between two torsion springs configured to act in series, and is engaged with the end surfaces of the adjacent torsion springs. Each cover part 57b covers the outer peripheral side parts and the front-cover-2 side lateral part of the torsion spring 56. Each protruding part 57c is formed in a part of the inner peripheral end of the intermediate member 57. The protruding parts 57c are disposed to be interposed between the disc part 27a and the axial positioning part 27g of the clutch output member 27. Further, the inner peripheral end surface of the protruding part 57c is contactable to the radial positioning part 27f of the clutch output member 27.

With the structure as described above, the intermediate member 57 restricts the torsion springs 56 from moving in the radial and axial directions by the cover parts 57b. Further, the intermediate member 57 is positioned in the axial and radial directions, while the plural protruding parts 57c are supported by the radial positioning parts 27f and the axial positioning parts 27g of the clutch output member 27.

It should be noted that each protruding part 57c is formed to have a width enabling it to pass through a clearance produced between adjacent two of the plural axial positioning parts 27g of the clutch output member 27. Further, when fitted to the clutch output member 27, the intermediate members 57 are firstly set in positions that the protruding parts 57c pass through the clearances produced between adjacent two of the plural axial positioning parts 27g of the clutch output member 27. Then, the protruding parts 57c are caused to pass through the clearances produced between adjacent two of the plural axial positioning parts 27g. Thereafter, the intermediate member 57 is rotated at a predetermined angle. Accordingly, the intermediate member 57 is fixed in the positions as illustrated in the drawing.

Actions

When the lock-up state of the lock-up device 6 is released, the first oil chamber L1 for lock-up actuation is connected to a drain through the first oil paths 51, while the operating oil is supplied to the second oil chamber L2 for lock-up releasing, which is disposed between the piston 30 and the front cover 2, from a control valve (not illustrated in the drawings) through the second oil paths 52. Accordingly, the piston 30 is moved toward the turbine 4, while the pressing part 30b of the piston 30 is separated away from the clutch plate 28.

Further, operating oil for torque converter actuation is supplied from the space between the stationary shaft 23 and the input shaft 18 of the transmission. The operating oil is supplied from the through hole 16f the turbine hub 16 to the space between the turbine hub 16 and the piston 30. The operating oil is directed to the outer peripheral end of the front cover 2 through the clearance produced between the front cover 2 and both of the clutch output member 27 and the intermediate member 57. Thereafter, the operating oil is supplied to the torque converter body. On the other hand, the operating oil within the torque converter body flows to the control valve (not illustrated in the drawings) through an oil path produced between the stator shell 20 and the impeller shell 10.

In the condition as described above, the torque from the front cover 2 is transmitted from the impeller 3 to the turbine 4 through the operating oil, and is further transmitted to the input shaft 18 of the transmission.

By contrast, when the lock-up device is turned into a lock-up state (power transmitted state), the second oil chamber L2 for lock-up releasing is connected to the drain through the second oil paths 52, while the operating oil is supplied to the first oil chamber L1 between the piston 30 and the oil chamber plate 29 through the first oil paths 51. Accordingly, the piston 30 is moved toward the front cover 2, and the clutch plate 28 is pressed between the front cover 2 and the piston 30.

In the condition as described above, the torque from the front cover 2 is transmitted from the clutch plate 28 to the damper mechanism 25 through the clutch output member 27.

In the damper mechanism 25, the torque inputted from the clutch output member 27 is transmitted to the turbine 4 through the torsion springs 56 and the output plate 55, and is further transmitted to the input shaft 18 of the transmission through the turbine hub 16.

It should be noted that where the control valve employs some type of specification, the operating oil may not be supplied to the second oil chamber L2 in lock-up releasing. Even in such a situation, the piston 30 is moved to a side away from the clutch plate 28 by the disc spring 40.

In such a condition, when the operating oil is left in the first oil chamber L1 while no operating oil exists in the second oil chamber L2, chances are that centrifugal force acts on the operating oil left in the first oil chamber L1 and the piston 30 is moved toward the clutch plate 28. Accordingly, drag torque is generated in the clutch portion 24.

However, in the present exemplary embodiment, the operating oil for the torque converter is supplied to the second oil chamber L2 through the third oil path 53. Therefore, centrifugal force acts on the operating oil, and movement of the piston 30 toward the clutch plate 28 is cancelled out.

The first oil chamber L1 for lock-up actuation is formed between the front cover 2 and the turbine 4, and the lock-up state is produced when the piston 30 is moved from the turbine-4 side to the front-cover-2 side. Therefore, the present lock-up device can be reduced in its axial dimension in comparison with a well-known lock-up device.

The first oil chamber L1 for lock-up actuation and the second oil chamber L2 for lock-up releasing are formed. Hence, responsiveness is enhanced in switching between lock-up actuation and lock-up releasing.

The second oil chamber L2 is composed of the piston 30 and the front cover 2. Therefore, the oil chamber for lock-up releasing can be composed of a small number of components, and the present lock-up device can be further reduced in its axial dimension.

The clutch engaging parts 27*b* and the damper engaging parts 27*c* are formed in the clutch output member 27. Hence, a power transmission path can be composed of a small number of components. Further, the clutch output member 27 can be easily positioned in the axial and radial directions by causing the axial contact part 27*e* and the radial contact part 27*d* of the clutch output member 27 to be contacted to the axial support part 16*d* and the radial support part 16*e* of the turbine hub 16. Thus, the structure for positioning the clutch output member 27 can be simplified.

The intermediate member 57 is positioned in the radial and axial directions by forming the radial positioning parts 27*f* and the axial positioning parts 27*g* in the clutch output member 27. Thus, the structure for positioning the intermediate member 57 can be simplified.

The first oil chamber L1 for lock-up actuation is provided independently from the other operating oil circuits. Hence, stable lock-up torque capacity can be herein obtained in comparison with a configuration to produce the lock-up state by utilizing the operating oil to be supplied to the torque converter body.

The third oil path 53 is herein provided. Hence, it is possible to inhibit occurrence of a situation that drag torque is produced by centrifugal force acting on the operating oil in the first oil chamber L1, even in the configuration that the operating oil is not supplied to the second oil chamber L2 for lock-up releasing in releasing the lock-up state.

The present invention is not limited to the exemplary embodiment as described above and a variety of changes or modifications can be made without departing from the scope of the present invention.

The lock-up device for a torque converter of the present invention can achieve, especially, reduction in axial dimension of the clutch portion.

The invention claimed is:

1. A lock-up device for a torque converter, the lock-up device being configured to transmit a torque from a front cover to a transmission-side member through a turbine of the torque converter, the lock-up device comprising:
    a clutch portion disposed between the front cover and the turbine, the clutch portion being configured to transmit or block the torque; and
    a damper mechanism configured to transmit the torque from the clutch portion to the turbine while being configured to absorb and attenuate a torsional vibration, wherein
    the clutch portion includes
        a clutch output member configured to output the torque to the damper mechanism;
        a clutch plate configured to transmit the torque between the front cover and the clutch output member;
        an oil chamber plate having a disc shape, the oil chamber plate being disposed between the front cover and an inner peripheral part of the turbine while being axially immovable with respect to the front cover;
        a piston disposed between the front cover and the oil chamber plate while being axially movable, the piston and the oil chamber plate forming a first oil chamber for lock-up actuation therebetween, the piston and the front cover forming a second oil chamber for lock-up releasing therebetween, the piston being configured to set the clutch portion in an engaged state by an operating oil to be supplied to the first oil chamber; and
        a seal member disposed between the piston and the front cover to seal the second oil chamber.

2. The lock-up device for a torque converter recited in claim 1, wherein
    the clutch portion further includes an axially extending annular boss, and
    an inner peripheral part of the oil chamber plate is fixed to an end of the annular boss disposed on the same side as the transmission, an end surface of the annular boss disposed on the same side as the front cover being fixed to the front cover, the piston being configured to axially slide along an outer peripheral surface of the annular boss, the annular boss having an oil path formed for supplying the operating oil to the first oil chamber.

3. The lock-up device for a torque converter recited in claim 2, wherein
the annular boss has an oil path formed for supplying the operating oil to the second oil chamber for lock-up releasing.

4. The lock-up device for a torque converter recited in claim 2, wherein
the turbine includes a plurality of turbine blades, a turbine shell supporting the plural turbine blades, and a turbine hub to which the turbine shell is coupled,
the turbine hub has a flange part that radially extends and to which an inner peripheral part of the turbine shell is coupled, and the flange portion includes an axial support part and a radial support part, the axial support part being formed in an outer peripheral part of the flange portion, the radial support part having a tubular shape and extending from an outer peripheral end of the axial support part toward the front cover, and
the clutch output member includes
a clutch engaging part being formed in a radially intermediate part of the clutch output member to extend toward the front cover, the clutch engaging part being engaged with the clutch plate while being axially movable and non-rotatable relative thereto;
a damper engaging part being formed in an outer peripheral part of the clutch output member, the damper engaging part being engaged with the damper mechanism;
a radial contact part being formed in an inner peripheral part of the clutch output member to axially extend in a tubular shape, the radial contact part being contacted to the radial support part of the turbine hub; and
an axial contact part protruding from the radial contact part to an inner peripheral side, the axial contact part being contacted to the axial support part of the turbine hub.

5. The lock-up device for a torque converter recited in claim 4, wherein
the damper mechanism includes
a plurality of torsion springs engaged with the clutch output member; and
an intermediate member disposed to be rotatable relative to the clutch output member, the intermediate member causing at least two of the plural torsion springs to act in series,
the intermediate member includes
a plurality of spring engaging parts engaged with end surfaces of the torsion springs;
a plurality of cover parts covering outer peripheral side parts and lateral parts of the torsion springs, the lateral parts being disposed on the same side as the front cover; and
a plurality of protruding parts extending from the cover part to the inner peripheral side, and
the clutch output member has a positioning part disposed to the outer peripheral side of the clutch engaging part and to the inner peripheral side of the damper engaging part, the positioning part being contacted to the plural protruding parts of the intermediate member to position the intermediate member.

6. The lock-up device for a torque converter recited in claim 5, wherein
the positioning part of the clutch output member includes
a radial positioning part contacted to an inner peripheral end surface of the intermediate member to radially position the intermediate member; and
an axial positioning part being contacted to lateral surfaces of the plural protruding parts of the intermediate member to axially position the intermediate member.

7. The lock-up device for a torque converter recited in claim 1, wherein
the turbine includes a plurality of turbine blades, a turbine shell supporting the plural turbine blades, and a turbine hub to which the turbine shell is coupled,
the turbine hub has a flange part that radially extends and to which an inner peripheral part of the turbine shell is coupled, and the flange portion includes an axial support part and a radial support part, the axial support part being formed in an outer peripheral part of the flange portion, the radial support part having a tubular shape and extending from an outer peripheral end of the axial support part toward the front cover, and
the clutch output member includes
a clutch engaging part being formed in a radially intermediate part of the clutch output member to extend toward the front cover, the clutch engaging part being engaged with the clutch plate while being axially movable and non-rotatable relative thereto;
a damper engaging part being formed in an outer peripheral part of the clutch output member, the damper engaging part being engaged with the damper mechanism;
a radial contact part being formed in an inner peripheral part of the clutch output member to axially extend in a tubular shape, the radial contact part being contacted to the radial support part of the turbine hub; and
an axial contact part protruding from the radial contact part to an inner peripheral side, the axial contact part being contacted to the axial support part of the turbine hub.

8. The lock-up device for a torque converter recited in claim 7, wherein
the damper mechanism includes
a plurality of torsion springs engaged with the clutch output member; and
an intermediate member disposed to be rotatable relative to the clutch output member, the intermediate member causing at least two of the plural torsion springs to act in series,
the intermediate member includes
a plurality of spring engaging parts engaged with end surfaces of the torsion springs;
a plurality of cover parts covering outer peripheral side parts and lateral parts of the torsion springs, the lateral parts being disposed on the same side as the front cover; and
a plurality of protruding parts extending from the cover part to the inner peripheral side, and
the clutch output member has a positioning part disposed to the outer peripheral side of the clutch engaging part and to the inner peripheral side of the damper engaging part, the positioning part being contacted to the plural protruding parts of the intermediate member to position the intermediate member.

9. The lock-up device for a torque converter recited in claim 8, wherein
the positioning part of the clutch output member includes
a radial positioning part contacted to an inner peripheral end surface of the intermediate member to radially position the intermediate member; and an axial positioning part being contacted to lateral surfaces of the plural protruding parts of the intermediate member to axially position the intermediate member.

* * * * *